May 15, 1945.　　　　E. A. MARKHAM　　　　2,375,860
IRRIGATION APPLIANCE
Filed April 16, 1941　　　　2 Sheets-Sheet 1
Fig. 1.
Fig. 2.
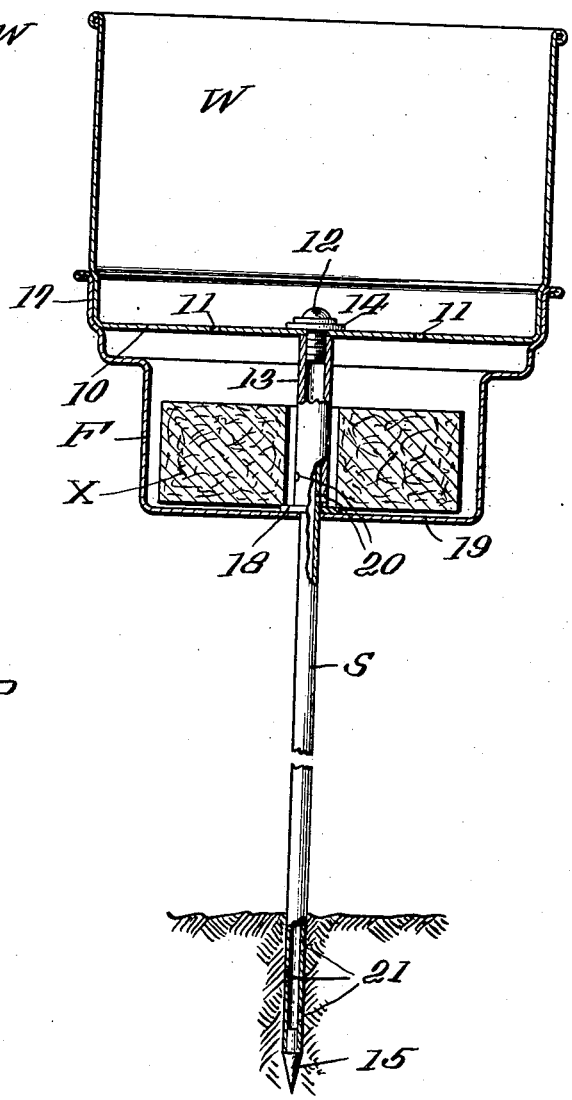
INVENTOR
Edwin A. Markham,
By Mason Porter,
ATTORNEYS May 15, 1945.  E. A. MARKHAM  2,375,860
IRRIGATION APPLIANCE
Filed April 16, 1941  2 Sheets-Sheet 2
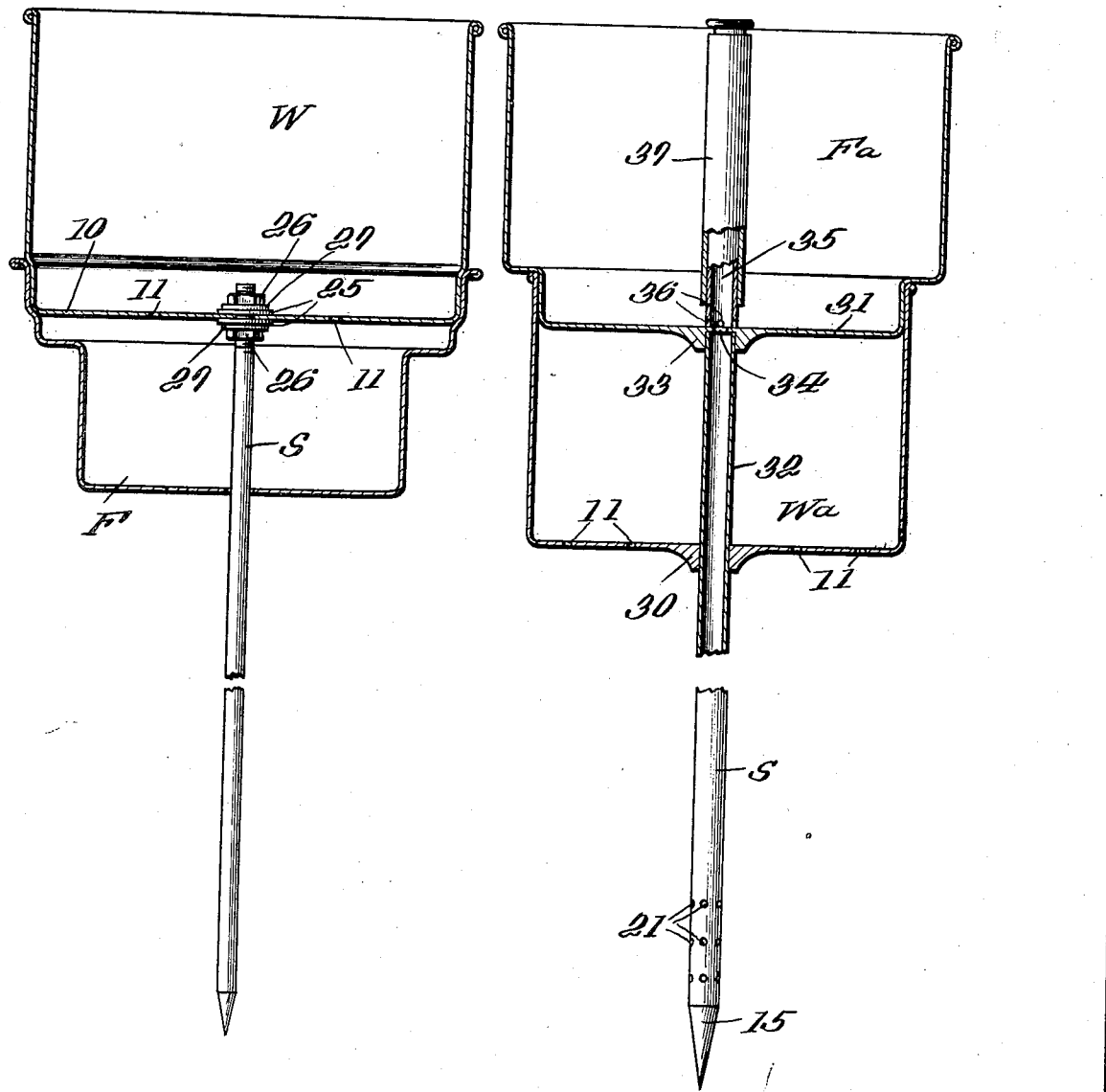

Patented May 15, 1945

2,375,860

UNITED STATES PATENT OFFICE 2,375,860

IRRIGATION APPLIANCE

Edwin Asa Markham, Gulfport, Fla.

Application April 16, 1941, Serial No. 388,850

10 Claims. (Cl. 47—49)

This invention is concerned with an appliance by which plants may be irrigated and, if desired, fertilized by employment of the irrigation stream.

A feature of the invention is the provision of a simple, cheap, and easily-positioned and maintained appliance for receiving a quantity of water and delivering it at a regulated rate to a desired part of a plant.

Another feature of the invention is the provision of an irrigation appliance having a water receptacle and a chamber for receiving a supply of a fertilizing medium which is slowly delivered to the plant at an irrigation rate below that for flooding the soil.

Other features of the invention reside in certain arrangements and combinations of structures as will be apparent from the following description and drawings, in which:

Figure 1 is a perspective view indicating a form of the appliance in use adjacent a plant.

Figure 2 is an upright diametrical section through one form of construction of the device.

Figure 3 is a similar section through a modified form of the device.

Figure 4 is a similar section through another modified form.

In Fig. 1, a plant P has its crown C at the usual soil level. The irrigating appliance with a water chamber W and a stem S is mounted adjacent the crown of the plant by pressing the lower end of the stem S into the soil. Under the conditions set forth below, a slow seepage of water can be obtained from the container W for sprinkling the leaves and stems of the plant P, or a slow flow of water may be delivered to the soil adjacent the crown C at a rate insufficient to cause flooding of the particular soil.

In Fig. 2, the container W is indicated as formed of sheet metal with a cylindrical side or jacket wall, a closing bottom member 10, and preferably with an opened top, so that the container may be easily and conveniently filled either before or after the stem S is inserted in position adjacent the crown of the plant. The bottom 10 has the small apertures 11 of restricted individual and total area. Centrally of the bottom 10, a screw 12 is passed downwardly into a threaded sleeve 13 which surrounds the upper end of the stem S, which in this form is constructed as a hollow tube closely fitting within the sleeve 13 and secured thereto by soldering for example. A packing 14 may be employed to seal the orifice around the screw 12. The lower end of the stem S is provided with a spud or point 15 which is secured within the tubular stem S by soldering or the like.

A lower container structure F is likewise of generally circular section, and has an upper flange 17 which can frictionally engage the lower end of the upper container W. The lower container F has an axial opening to receive the stem S, and a sealing member 18 is preferably located on the stem S for engagement between the sleeve 13 and the bottom wall 19 of the container F to prevent the normal passage of water directly downward along the stem S in cases where the lower container F is mounted in its frictionally-engaged position on the container W.

The sleeve 13 and the end of the stem S which is located within the sleeve 13 have a plurality of apertures 20 by which fluid can pass from within the container F into the interior of the stem S and downwardly in the same. The lower end of the stem S similarly has openings 21 by which the fluid within the stem S may escape to the exterior.

When this full assembly is employed, the lower container F may be slid from the stem S and a cake X, including a slowly soluble fertilizing element, may be inserted and the container F slid onto the stem until its flange 17 frictionally engages and supports it in position.

When the form of the device shown in Fig. 2 is in use, the spud end 15 permits pressing the lower end of the stem S into the soil, as shown in Fig. 1, usually until the lower apertures 21 are beneath the surface of the soil. Water can then be poured into the upper container W. From this container, it passes at a restricted rate through the apertures 11 onto the fertilizer block X and establishes a weak fertilizing solution which is discharged through the openings 20, the hollow stem S, and the openings 21, to the soil closely adjacent the crown C of the plant. It will be noted that by controlling the penetration of the stem S, a surface or a deep fertilization and irrigation can be accomplished as desired.

It is also feasible to utilize the structure of Fig. 2 for irrigation only at a slow rate, since the apertures do not permit the immediate discharge of the quantity of liquid in the container W, but dole this out so slowly that no flooding of the soil, with accompanying loss of water and of fertilizing values, occurs.

If it is desired to accomplish a sprinkling of the leaves and stem of the plant, the lower container F may be removed, and the device positioned with the upper container W above the leaves. The water then percolates through the openings 11 and drips slowly onto the leaves and stems, and finally passes to the ground around the plant.

In the form shown in Fig. 3, the container W has its lower wall 10 secured fixedly to a solid rod S. In the illustrative form, this is accomplished by threading the upper end of the rod S and providing the packing washers 25 and the nuts 26, together with pressure washers 27. This form of structure may also be provided with the lower container F, if so desired. Since the stem S is not hollow, as in the form of Fig. 2, the central aperture of the lower container F is slightly larger than the stem S, to provide a restricted passageway by which the liquid contents of the container F may flow downward along the stem S and be discharged to the ground adjacent the crown C of the plant.

As with Fig. 2, the form of Fig. 3 may be employed without the fertilizer material X, and without the lower container F, if so desired.

It will be noted that the containers W and F closely resemble the upper water and the intermediate coffee container of the usual drip percolator; and by way of definition, it may be pointed out that the bottom wall 10 may have openings 11 which in size and number correspond to those in a coffee percolator.

In the form of construction shown in Fig. 4, the hollow stem S has the lower point portion 15 and lower apertures 21. This stem S passes through the floor or lower wall of the irrigating reservoir Wa, which has the holes 11 of restricted individual and total area; the reservoir Wa is secured and sealed to the stem by a boss 30. The fertilizer container Fa in this modification is mounted above the irrigating reservoir Wa, having a reduced portion which is received and guided in the latter so that the floor or lower wall 31 of the container Fa is brought close to the upper end 32 of the stem S, and a boss 33 on the floor 31 can engage the end 32 for sealing the same, and an aperture 34 in the floor 31 is brought into communication with the interior of the stem S. A hollow tubular member 35 is secured to the floor 31 and extends upwardly in the container Fa, being provided with apertures 36 close above the floor 31 so that the liquid contents of the container Fa can drain through openings 36, 34 and the hollow stem S, and thence pass to the exterior through openings 21. A sleeve 37 has a close frictional fit upon the member 35 so that it can be slid upwardly and downwardly thereon and can maintain its adjusted position; in the lowermost position it closes the apertures 36 and prevents the aforesaid flow therethrough.

With this construction, it is possible simultaneously to deliver a slow sprinkle of water to the leaves and stems, and to deliver a fertilizing solution to the crown or roots. The fertilizer container Fa can be loaded with a dose of soluble fertilizer and water, while the valving sleeve 37 is in closed position; the dissolution is permitted to occur, and then the valving sleeve 37 is opened so that the solution flows to the plant. Obviously, a slowly soluble mass or cake of fertilizer can also be used as with Fig. 2. Further, it will be noted that the fertilizer container Fa with its associated parts may be placed and removed while the irrigating reservoir Wa is in position; and that the container Fa may be charged, and then positioned upon and in a reservoir Wa and its stem S.

It will be noted that in each of these preferred forms, the structure is substantially symmetrical in that the reservoirs and containers and the stem S are coaxial. Hence, the device has a neat appearance, and is free of projections which might disturb the foliage of a plant if the structure is rotated while it is being put in place. Further, since the device is normally placed in a substantially vertical position, the weight is uniformly distributed from the containers to the stem.

It is obvious that the invention is not limited to the forms of construction shown but that it may be employed in many ways within the scope of the appended claims.

I claim:

1. An irrigation appliance comprising first and second containers for liquids, one of the containers having a flat bottom with restricted apertures therein for regulating the flow of liquid from said one container, and a hollow supporting stem extending through the bottom of the second container and connected thereto in supporting relationship, the stem being adapted at its lower end to be embedded in the soil adjacent the crown of a plant to be irrigated, said stem having an aperture inside of and adjacent the bottom of the second container and another aperture outside of the second container and adjacent the lower end of the stem, the containers having portions for telescoping engagement whereby the first container can support the second container.

2. An irrigation appliance comprising a first container for liquids, said container having apertures in its bottom, a hollow supporting stem connected to said container and extending downwardly therefrom, and a lower container slidable along said stem into a raised position closely beneath the first container, said appliance including means for holding said lower container in said raised position, said stem having an aperture open within the lower container when in the said position and an aperture below said container.

3. An irrigating and fertilizing appliance comprising a container structure for receiving a slowly soluble fertilizer medium and a supply of water, a duct connected in substantially sealed relationship with the bottom of the container and having an aperture within the container for receiving fertilizer solution therefrom, the container structure including means for restricting the rate of flow of water to said fertilizing medium, the lower end of the duct providing a hollow supporting stem and having a closing spud at its lower end for easy penetration into the soil adjacent a plant, said stem having an aperture for delivery of the fertilizer solution to the soil adjacent the plant.

4. An irrigation appliance comprising a container for liquids, a hollow supporting stem connected at its upper end to the bottom wall of the container, said container having apertures of restricted individual and total area in its bottom wall, a secondary container adapted to be seated in said first container and having a bottom opening for registry with the upper end of said hollow stem, said stem having an aperture for the passage of liquid to the plant, and means for sealing said secondary container to said hollow stem.

5. An irrigation appliance comprising a container for liquids, a hollow supporting stem connected at its upper end to the bottom wall of the container, said container having apertures of restricted individual and total area in its bottom wall, a secondary container adapted to be seated in said first container and having a bottom opening for registry with the upper end of said hollow stem, said stem having an aperture for the passage of liquid to the plant, means for sealing said secondary container to said hollow stem, and valve means for closing said opening.

6. An irrigation appliance comprising a container for liquids, a hollow supporting stem connected at its upper end to the bottom wall of the container, said container having apertures of restricted individual and total area in its bottom wall, a removable second container adapted for receiving a solid fertilizer and a liquid and having parts for engagement with the first container whereby the second container is supported in position and having its bottom wall adapted to engage the stem, and sealing means for causing liquid to flow from the second container into the stem, said stem having an aperture for the passage of liquid to the plant.

7. An irrigation appliance comprising a container for liquids, said container being substantially symmetrical about an axis, a coaxial supporting stem connected at its upper end to the bottom wall of the container and having a sharpened lower end for embedding in the soil adjacent the crown of the plant to be irrigated and thereby effective to hold the container at a level above foliage of the plant for assuring convenient placing and removal of the appliance without injury to the plant, said container having restricted apertures distributed over the area of the bottom wall through which water may pass to the plant at a rate below that of flooding whereby all the water is retained closely adjacent the position of the appliance, and a removable member effective in an applied position for receiving the water passing through the apertures and conveying the same to the stem for delivery therealong toward the crown and said appliance being effective in the absence of said member for foliage irrigation of the plant.

8. An irrigation appliance comprising a container for liquids, a hollow supporting stem fixedly connected at its upper end to the container and adapted at its lower end to be embodied in the soil adjacent the crown of a plant to be irrigated, said appliance having apertures of a restricted total area in the bottom wall of the container through which water may pass from the container at a rate below that of flooding whereby all the water is retained closely adjacent the position of the appliance, and a member removably positioned beneath said container and effective in said position for receiving the water passing through the apertures and delivering the water into said hollow stem, said stem having apertures adjacent its lower end through which water may pass from the interior of the stem to the plant.

9. An irrigating appliance consisting of a first, upwardly-open container for liquids, a hollow supporting stem rigidly connected at its upper end to the bottom of the container and being disposed coaxial therewith; said stem having a lower end for embedding in the soil adjacent the crown of a plant, whereby to maintain the appliance in position with its axis substantially vertical and with the container elevated above the ground, said stem having a discharge aperture near its lower end, said container including restricted apertures distributed over the area of the bottom wall through which water may pass to the plant at a rate below that of flooding, whereby all the water is retained closely adjacent the position of the appliance; and a second, removable container having a central aperture for receiving the stem and being otherwise essentially imperforate, the hollow stem having an opening in its wall through which water may flow from said removable container into the space in said hollow stem, said removable container having its periphery constructed and arranged for supporting engagement with the periphery of said first container.

10. An irrigating appliance consisting of first and second coaxial containers having inter-engaging peripheral portions for supported assembly thereof, and a hollow supporting stem rigidly connected to and coaxial with said first container, the second container being removable from the first container; said stem having a lower end for embedding in the soil adjacent the crown of a plant whereby to maintain the appliance in position with its axis substantially vertical and with the said first container elevated above the ground, said hollow stem having a discharge aperture near its lower end, said stem having near its upper end an opening for communicating with the space within one of the containers and said latter container having its bottom otherwise essentially imperforate so that liquid therein is caused to flow through the said opening and downward in said hollow stem, the other container having restricted apertures distributed over the area of the bottom wall thereof and through which water may be discharged and pass to the plant at a rate below that of flooding; whereby all the discharged water is retained closely adjacent the position of the appliance.

EDWIN ASA MARKHAM.